Patented June 15, 1926.

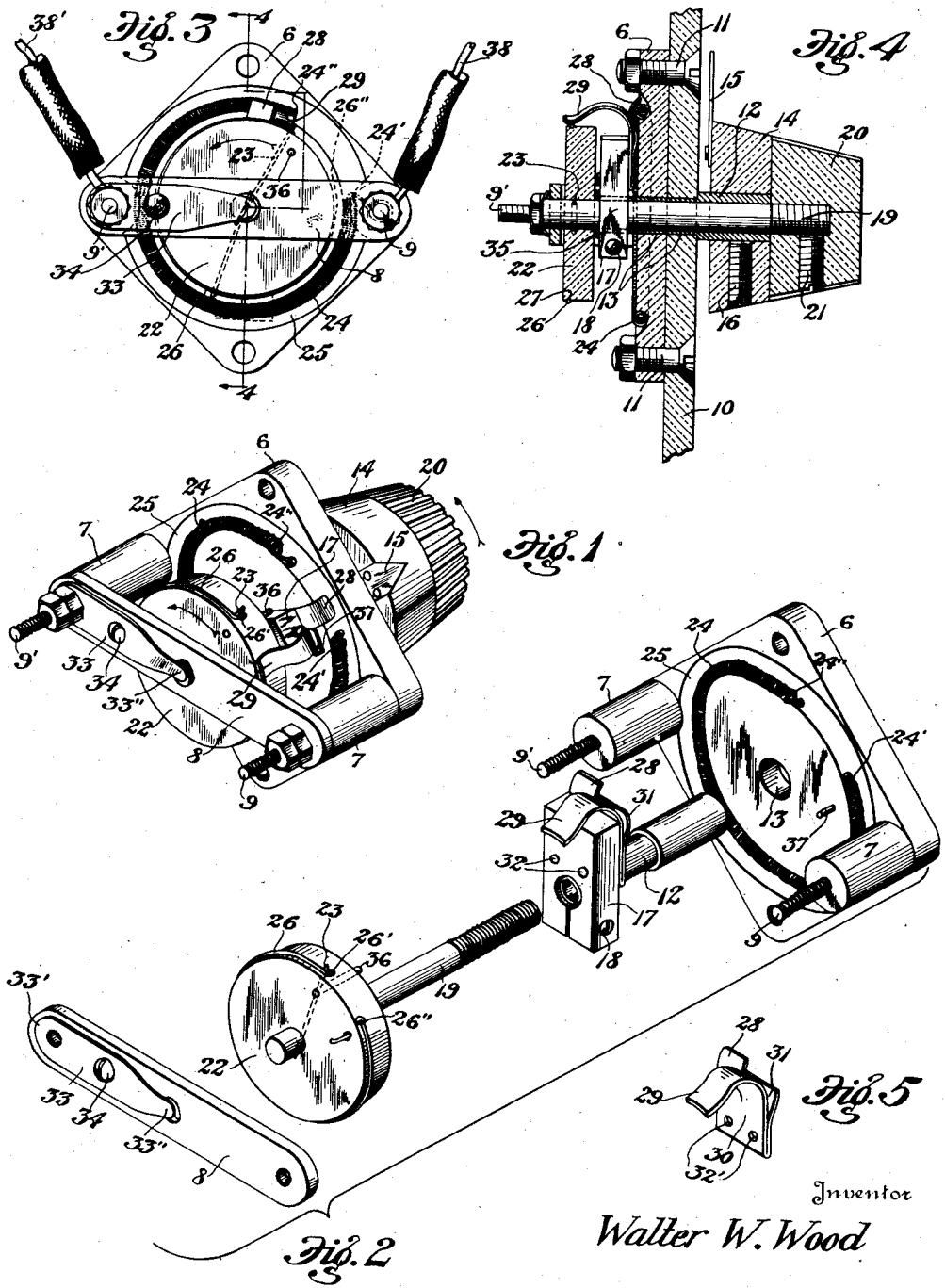

1,589,034

UNITED STATES PATENT OFFICE.

WALTER W. WOOD, OF CANTON, OHIO.

RHEOSTAT.

Application filed September 1, 1922. Serial No. 585,701.

The invention relates to means for varying the resistance of an electric current to control the amount of current flowing through the same; and the object of the improvement is to provide simple means for controlling the strength of the current with a greater degree of refinement of adjustment, and for arriving at the critical value of the resistance more conveniently and quickly than has ordinarily been done.

In radio apparatus it is desirable, if not necessary, to adjust the electric current flowing through the filament of the detector or amplifying tubes to an exact critical value for the most efficient operation of the same; and the present invention attains this result by means of an annular resistance coil mounted on a relatively fixed support, an annular vernier wire mounted on a rotatable disk and intermediate connected brushes mounted on an independently rotatable block, so arranged that an approximate adjustment may be obtained by rotating the brushes and the vernier wire together in one direction, and an exact adjustment may be obtained by rotating the vernier wire alone in the opposite direction.

The invention is illustrated in the accompanying drawings forming part hereof, in which—

Figure 1 is a perspective view of the improved rheostat;

Fig. 2, a perspective view of the parts thereof, in axial alignment for assembling;
Fig. 3, an inner end view of the rheostat;

Fig. 4, an axial section of the same, on line 4—4, Fig. 3; and

Fig. 5, a detached perspective view of the brushes.
Similar numerals refer to similar parts throughout the drawings.

A supporting frame for the rheostat may comprise a square plate 6, with spacing posts 7 extending inward from two opposite corners of the plate, and a cross bar 8 extending across the ends of the posts; and these parts may be secured together by current conducting bolts 9 and 9', extending through the corners of the plate, the axes of the posts and the ends of the connector bar. The supporting frame may be secured to the panel 10 of a radio receiving box,
by bolts 11, at the alternate corners of the plate.

A tubular bearing 12 is journaled in an axial bearing 13 provided in the supporting plate and panel. Upon the outer end of the tubular bearing may be secured a spacer block 14, carrying an indicating finger 15, as by means of a set screw 16; and upon the inner end of the tubular bearing is secured a radial brush block 17, as by means of a clamping screw 18.

An operating stem 19 is journaled in the tubular bearing. Upon the outer end of the stem is secured an operating handle or button 20, as by means of a set screw 21; and upon the inner end of the stem is secured a vernier disk 22, as by means of a current conducting pin 23 extending through the stem and the body of the disk to the periphery thereof.

An annular resistance coil 24 is located in an annular groove 25 on the inner side of the supporting plate. One end 24' of the coil terminates adjacent to and is connected by an extension wire with one of the conducting bolts 9; and the other end 24'' of the coil terminates at a spaced interval from the circuit connected end, and has an insulated connection with the supporting plate.

A vernier wire 26 is located in a shallow groove 27 around the periphery of the disk 22. One end 26' of the vernier wire 26 is connected to the periphery end of the conducting pin 23, and the other end 26'' of the wire terminates at a substantial interval from the circuit connected end, and has an insulated connection with the disk.

Brushes 28 and 29 are preferably made of resilient sheet metal strips in the form of tongues cut from an integral sheet 30 folded to form a spring plate 31 on one side, and the brush sheet may be secured to the side of the brush block 17, as by rivets 32 extending through apertures 32' in the folded sheet.

One brush tongue 28 extends outward beyond the end of the brush block, and is curved for sliding and yielding contact with the resistance coil. The other brush tongue 29 extends inward over the end of the brush block, and is curved for a sliding and yielding contact with the vernier wire. The spring plate 31 extends outward from the brush block, and is curved for sliding and pressing frictional contact with the inner face of the supporting plate.

A spring conductor strip 33 is secured to the inner side of the connecting bar 8, as by means of a screw 34. One end 33' of the spring strip is connected with the other circuit conducting bolt 9', and the other end 33" of the spring strip is in yielding pressing contact with the end of the operating stem 19; which end of the stem serves as a conductor to complete the circuit between the conductor pin 23 and the conductor strip 33.

The tubular bearing 12 is held in position endwise on the operating stem 19, by the abutment of its outer end against the inner side of the operating button 20, and by the abutment of an annular shoulder 12' on the bearing against the outer side of the panel 10. The operating stem is held in position endwise by the abutment of the operating button 20 against the outer end of the tubular bearing 12, and the abutment of the disk 22 against the washer 35 located between the disk and the inner end of the tubular bearing. The inner face of the disk 22 is normally spaced outward freely from the cross bar by action of the spring conductor strip 33, but the disk serves as a positive stop if the stem is pushed inward to overcome the pressure of the spring conductor strip upon its outer end.

A push pin 36 is provided on the outer side of the vernier disk adjacent to the circuit connected end of the vernier wire in the path of the brush block, and in such a position that a rotation of the disk by a turning of the button will cause the push pin to impinge one side or the other of the brush block, so as to rotate it with the disk.

A stop pin 37 is provided on the inner face of the supporting plate 11 adjacent to the circuit connected end of the resistance coil in the path of the brush block, and in proper position to stop the brush block with the coil brush 28 in contact with the circuit connected end of the coil, as indicated by broken lines in Fig. 1, when it is rotated by turning the top of the operating button and vernier disk to the right, as indicated by an arrow in Figs. 1 and 3 of the drawings; in which position of the parts the vernier brush is in contact with the circuit connected end of the vernier wire and resistance of the coil and the wire is reduced to the minimum.

The same pin serves to stop the brush block when it is reversely rotated by a turning of the button and disk to the left, after the brush 28 has passed beyond the end of the coil 24 of the resistance coil and stands free of the coil, as shown in full lines, in Fig. 4 of the drawings; the same being the normal or inoperative position of the parts the vernier brush is positioned to be in contact with the circuit connected end of the vernier wire, as shown in the same figure.

The rheostat is connected in an electric circuit, as the film circuit of the detector or amplifier tubes in a radio receiving apparatus, by conductor wires 38 and 38' connected with the conductor bolts 9 and 9'; and when it is desired to close the circuit and adjust its strength by the rheostat, the same being in normal inoperative position, as shown in Fig. 1, the operating button is turned to the right, as indicated by the arrow, which rotates the vernier disk in the same direction, during which turning of the disk the friction action of the spring plate retards the brush block from turning and the vernier wire slides under the vernier brush 29, so that the brush is in contact with the circuit connected end 26' of the wire when the brush pin impinges the left side of the brush block.

A further turning of the vernier disk to the right rotates the brush block in the same direction until the coil brush 28 contacts with the insulated end 24" of the resistance coil, as shown by full lines, in Fig. 3, whereupon the circuit is closed through the whole length of the resistance coil, but without including any considerable portion of the vernier wire.

A further turning of the disk to the right rotates the coil brush 28 in the same direction and gradually cuts out from the circuit a corresponding portion of the resistance coil 24 until the strength of the circuit is increased to a degree slightly beyond the desired critical value, as may be indicated by the filament or other means in the circuit; whereupon the rotation of the disk by the button may be reversed, during which movement the retarding pressure of the spring plate 31 holds the brush block and the brushes thereon in the approximate position which has been given to them, and the vernier wire slides under the vernier brush so as to include enough of the wire in the circuit to decrease its strength to the exact critical value desired.

When it is desired to reopen the circuit, the operating button is rotated to the left until the push pin 36 on the vernier disk impinges the right side of the brush block, whereupon the brush block is rotated to the left until it impinges the stop pin 37 and the parts are brought into the normal position shown in Fig. 1.

The spacer block 14 rotates in unison with the brush block, and the indicating finger 15 thereon is properly positioned thereon to show to the operator the location of the brushes, if for any reason the same is necessary or desirable; but it is evident that the operation of the rheostat is automatically accomplished from normal position, by merely turning the button to the right to close the circuit and to effect an approximate adjustment, followed by a slight turning to the left to effect an exact adjustment; and that if an exact adjustment is not attained by the initial operations the same may be repeated at will until the exact adjustment desired is attained.

I claim:—

1. A rheostat including a support with an annular resistance coil thereon, a rotatable disk with an annular resistance wire thereon, a rotatable block with connected brushes thereon for sliding contact with the wire and coil respectively, and means for rotating the disk and block together, and for rotating the disk alone.

2. A rheostat including a support with an annular resistance coil thereon, a rotatable disk with an annular resistance wire thereon, a rotatable block with connected brushes thereon for sliding contact with the wire and coil respectively, and means for rotating the disk and block either way together, and for rotating the disk either way alone.

3. A rheostat including a support with an annular resistance coil thereon, a rotatable disk with an annular resistance wire thereon, a rotatable block with connected brushes thereon for sliding contact with the wire and coil respectively, and means for rotating either brush upon the corresponding resistance element and holding the other brush stationary upon the other resistance element.

4. A rheostat including a support with an annular resistance coil thereon, a rotatable disk with an annular resistance wire thereon, a rotatable block with connected brushes thereon for sliding contact with the wire and coil respectively, and means retarding rotation of the block for sliding the resistance wire under the corresponding brush while the other brush is stationary on the resistance coil.

5. A rheostat including a support with an annular resistance coil thereon, a rotatable disk with an annular resistance wire thereon, a rotatable block with connected brushes thereon for sliding contact with the wire and coil respectively, and means on the disk for pushing the block either way with the disk, and means on the support for stopping rotation of the block one way with the coil brush on the circuit connected end of the coil and the other way with the brush free of both ends of the coil.

6. A rheostat including a support with an annular resistance coil thereon, a tubular bearing journaled in the support with connected brushes thereon, and an operating stem journaled in the tubular bearing with an annular resistance wire thereon, the brushes being arranged for sliding contact with the coil and the wire respectively.

7. A rheostat including a support with an annular resistance coil thereon, a tubular bearing journaled in the support with connected brushes thereon, an operating stem journaled in the tubular bearing with an annular resistance wire thereon, the brushes being arranged for sliding contact with the coil and the wire respectively, and means on the tubular bearing indicating the position of the brushes thereon.

8. A rheostat including a relatively stationary support with a resistance element thereon, a relatively movable support with another resistance element thereon, a movable block with connected brushes thereon for sliding contact along the respective resistance elements, the movable support being mounted for movement either with or without the movable block.

9. A rheostat including a relatively stationary resistance element and a relatively movable resistance element arranged to be connected in series, and connected brushes movably mounted for sliding contact along the respective resistance elements, the movable resistance element being movable either with, or with respect to, the corresponding brush.

10. A rheostat comprising, in combination, a primary resistance member mounted in fixed position, a secondary resistance member, a contact member loosely mounted relatively to said resistance members and having frictional engagement with each and means to move said secondary resistance member independently of said contact member and also in unison therewith relatively to said primary resistance member to vary the resistance to an electric current passing therethrough.

11. A rheostat comprising, in combination, a primary resistance member mounted in fixed position, a secondary resistance member, a contact member loosely mounted relatively to said resistance members and having frictional engagement with each and means to move said secondary resistance member relatively to said contact member and the latter relatively to said primary resistance member to vary the resistance to an electric current passing therethrough.

12. A rheostat comprising, in combination, a primary resistance member mounted in fixed position, a secondary resistance member, a contact member loosely mounted relatively to said resistance members and having frictional engagement with each and means to move said secondary resistance member relatively to said contact member and said secondary resistance member and contact member in unison relatively to said primary resistance member to vary the resistance to an electric current passing therethrough.

13. A rheostat comprising, in combination, a primary resistance member mounted in fixed position, a secondary resistance member, a contact member loosely mounted relatively to said resistance members and having frictional engagement with each, said friction being greater relatively to said primary resistance member than to said secondary resistance member and means to move said secondary resistance member independently of said contact member and also in unison therewith relatively to said primary resistance member to vary the resistance to an electric current passing therethrough.

WALTER W. WOOD.